3,178,201
AXLE LIFT
Erick G. Richnow, Jr., Houston, Tex., assignor to Truck Accessories, Inc., a corporation of Texas
Filed Sept. 8, 1964, Ser. No. 394,969
3 Claims. (Cl. 280—104.5)

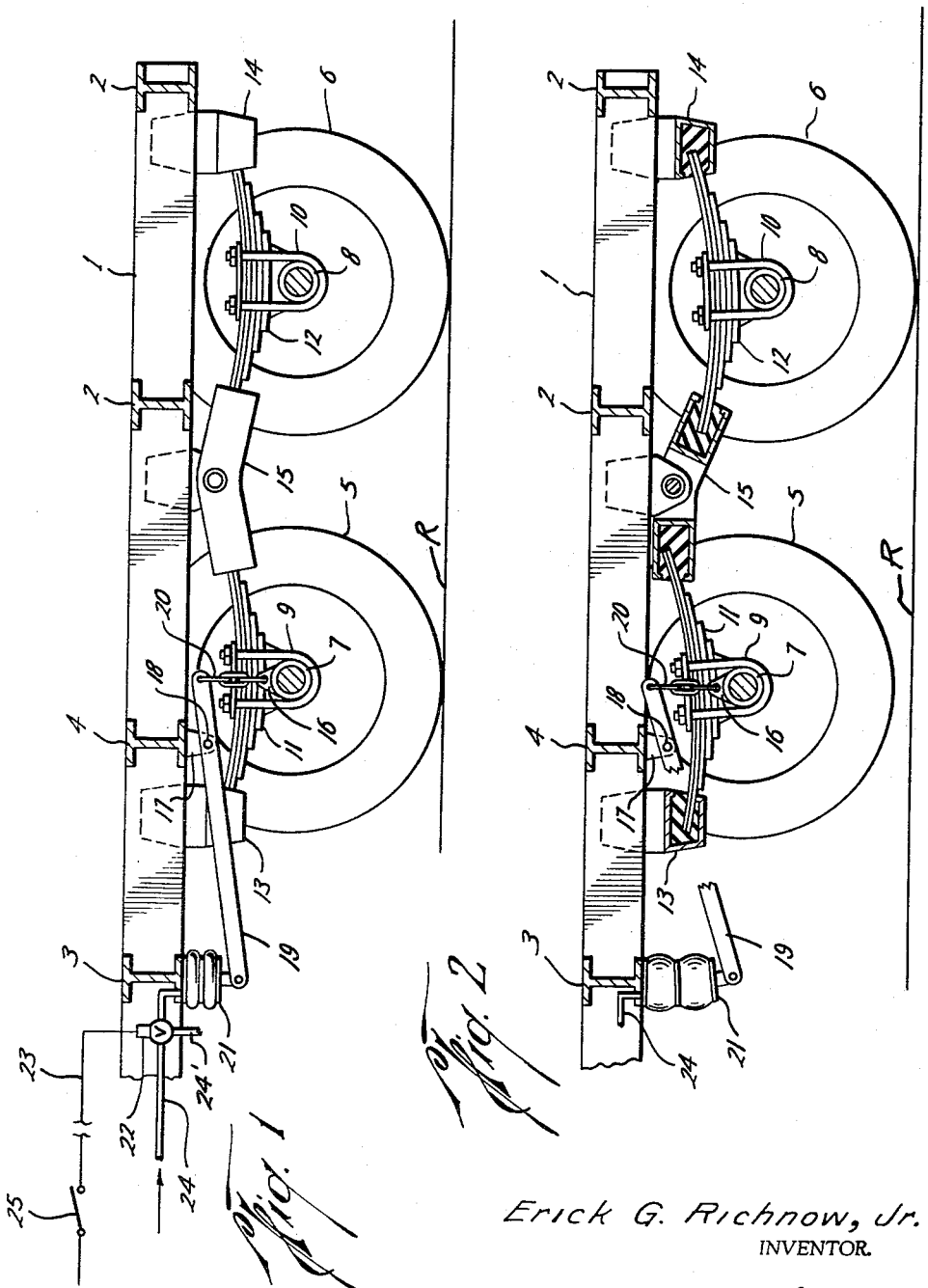

This application is a continuation-in-part of my co-pending United States patent application, Serial No. 159,494, filed December 13, 1961, now abandoned.

This invention relates to new and useful improvements in an axle lift.

It is an object of this invention to provide a means for lifting an axle of a truck or trailer having a tandem wheel structure, so that the axle lifted, and the wheels mounted thereon, will be raised off of the road surface and maintained in that position during the operation of the vehicle.

It is another object of the invention to provide a device for lifting an axle and the wheels mounted thereon to preserve the tires of the vehicle.

In trucking, vehicles having tandem wheel structures often travel empty, and the need for double sets of axles and wheels does not exist. In such instances the tires on both sets of wheels wear more readily than when the vehicle is loaded. It is an object of this invention to provide means for raising one set of a tandem set of axles and wheels, and maintaining the raised set in a raised position, off of the road surface, directing the load of the vehicle onto the remaining set of axle and wheels while the vehicle is traveling.

With the above and other objects in view, the invention has relation to certain novel features of construction, operation and arrangement of parts more particularly defined in the following specifications and illustrated in the accompanying drawings, wherein:

FIG. 1 is a side elevational view, partially in cross section, illustrating the tandem wheel structure having both axles in lowered position, and FIG. 2 is a side elevational view, partially in cross section, illustrating one set of wheels in the tandem wheel structure in raised position.

Referring now more particularly to the drawings, the numeral 1 designates a truck or trailer framework, having the usual cross members 2, 2. Additional cross members, such as the I-beams 3, 4, are mounted in the trailer framework 1. The tandem structure, having the wheels 5, 6 and axles 7, 8 are mounted on the framework 1 in the usual manner, the shackles 9, 10 securing the axles 7, 8 to the springs 11, 12 and the springs 11, 12 having one end, respectively, mounted in the fixed mounts 13, 14 and the other ends mounted in the pivotal mount 15.

Midway of the wheels on the axle 7 is the lifting link 16. Midway of the side members of the frame 1, on the cross member 4, is a bearing box 17 having a suitable bearing 18 on which the pivotal lever 19 is mounted. One end of the lever 19 extends over and in vertical alignment with the lifting link 16, and is connected thereto as by means of the chain 20. The other end of the lever 19 is pivotally mounted on the lower end of the bellows 21. The bellows 21 is mounted on the cross member 3, and an air supply conduit 24 extends into the upper end of said bellows 21, the other end of the air conduit 24 being connected into the usual reserve air supply (not shown) carried by the vehicle. A solenoid valve 22, of conventional structure, directs a flow of air into the bellows 21 from line 24 when in one position and relieves the supply of air in the bellows to atmosphere through line 24' when in another position. This valve 22 may be operated manually, but it is preferably connected into the electrical system of the vehicle by means of the electrical conduit 23 in which a control switch 25 is mounted at any desired position, such as in the cab of the vehicle.

In operation, when the vehicle is traveling empty or with a small load, the valve 22 is actuated to open the line 24 for communication with the bellows 21, and to close the line 24', by closing the switch 25 or by manual manipulation of the valve 22, so that air from the source of air pressure flows into the bellows 21 to lower one end (the left end as viewed in the drawings) of the lever 19 and raise the other end of the lever 19 (right end as viewed in the drawings) and thereby to raise the axle 7, lifting the wheels 5 off of the road surface, and maintaining them in this position, with the pivotal spring mount 15 rocking to permit the end of the spring 11 mounted therein to rise and the other end of said mount 15 to move downwardly, directing the full load of the framework 1 onto the wheels 6.

The effect of raising the one set of wheels is to place sufficient load on the other set of wheels to greatly reduce the bounce experienced in empty vehicle travel, protecting the tires on the wheels 6 from bruise and wear.

When it is desired to operate the vehicle with all of the wheels of the tandem structure in road contact, the valve 22 is moved to another position by opening the switch 25 or by manual manipulation of the valve 22, so as to close the line 24 and open the line 24' for thus opening the bellows 21 to atmosphere through the line 24' for relieving pressure in the bellows 21, causing the bellows to at least partially collapse to the partially inflated position shown in FIG. 1, and thus permitting the axle 7 and wheels 5 to drop back into load carrying position. By reason of the inherent resiliency of the flexible wall of the bellows 21, which is normally made of rubber or similar material which is molded to retain approximately the shape shown in FIG. 1 even when only atmospheric pressure is present therein, all of the air in the bellows 21 is not exhausted when the wheels 5 are in their normal load carrying position on a substantially level or smooth road R. Therefore, should the wheels 5 drop into a hole or depression (not shown) in the road R, a downward pull on the chain 20 and a clockwise pivoting (as viewed in FIG. 1) of the lever 19 will occur to exert an upward compressive force on the bellows 21. Such bellows 21 will then be compressed and will gradually and slowly discharge air therefrom through the orifice or restriction provided by the valve 22 and then will be vented to atmosphere through the vent tube 24'. Since the valve 22 acts as a restriction or orifice as the air is thus forced from the bellows 21, there is a retarding effect or resistance to such compression which results in a shock-absorbing effect and usually causes a lateral expansion or extension of the bellows wall to accomplish same. Such shock-absorbing effect of the bellows 21 is in addition to the shock-absorbing effect provided by the spring 11. It is important to note that the compression of the bellows 21 permits the spring 11 to function to absorb shock without detrimental snubbing when the wheels 5 drop into a hole. Furthermore, when the wheels 5 return upwardly to the normal smooth surface of the road R, the bellows 21 automatically re-inflates to the partially inflated condition of FIG. 1 due to the inherent resiliency of the wall of the bellows 21, which causes the bellows to partially re-expand and in doing so to fill with air at atmospheric pressure from the tube 24'.

While the foregoing is considered a preferred form of the invention, it is by way of illustration only, the broad principle of the invention defined by the appended claims.

What is claimed is:

1. An axle lift for use with a vehicle frame having at least two pairs of wheels arranged in tandem, wherein each pair of wheels has shock-absorbing means operably connected to its axle for absorbing shock during the normal use of the wheels on the ground, the improvement residing in:
- (a) a pivot arm having a first section and a second section with an intermediate pivotal connection point between said sections for pivotally connecting to said vehicle frame,
- (b) pivot connection means pivotally connecting said pivot arm to said vehicle frame at said intermediate pivotal connection point,
- (c) a fluid bellows having a laterally extensible wall for enabling said bellows to be compressed,
- (d) means connecting said first section to the axle of one of said pair of wheels,
- (e) means securing the upper end of said bellows to said frame to resist movement thereof,
- (f) means securing the lower end of said bellows to said second section for compressing the bellows to absorb shock when said one pair of wheels drops in a hole or the like when in use by causing a compression of the fluid in the bellows and a lateral extension of the wall of the bellows, and
- (g) means for introducing fluid under pressure into said bellows for expanding same to lift said one pair of wheels off the ground.

2. An axle lift for use with a vehicle frame having at least two pairs of wheels arranged in tandem, wherein each pair of wheels has shock-absorbing means operably connected thereto for absorbing shock during the normal use of the wheels on the ground, the improvement residing in:
- (a) a fluid bellows connected to said vehicle frame for exerting an upward lifting force on one pair of said wheels when said bellows is expanded,
- (b) said bellows having a resilient wall which is adapted to retain its shape when only atmospheric pressure is present therein,
- (c) linkage means connecting said fluid bellows to said one pair of wheels for converting the expansion of said bellows into an upward lifting force on said one pair of wheels,
- (d) the linkage means being connected to said fluid bellows to position same in a partially deflated position when said one pair of said wheels is on the ground at substantially ground level,
- (e) means to permit compression of the bellows upon a dropping of said one pair of said wheels from the ground level into a hole to thereby permit functioning of the shock-absorbing means connected to said one pair of said wheels to absorb shock due to such dropping,
- (f) the wall of said bellows being resilient to return the bellows to its partially deflated position after said one pair of said wheels returns to substantially the ground level, and
- (g) means for introducing fluid under pressure into said fluid bellows for expanding same to impart the upward lifting force on said one pair of said wheels to lift said one pair of said wheels off the ground.

3. The structure set forth in claim 2, wherein said means to permit the compression of the bellows is an orifice which restricts the exhausting of air from the bellows to provide a slow discharge of such air from the bellows and a resultant shock-absorbing effect which supplements the shock-absorbing action of the shock-absorbing means connected to said one pair of said wheels.

References Cited by the Examiner

UNITED STATES PATENTS

| 2,391,948 | 1/46 | Couse | 180—22 |
|---|---|---|---|
| 2,864,453 | 12/58 | La Belle | 180—22 |

FOREIGN PATENTS 568,630  11/57  Italy.

MILTON BUCHLER, *Primary Examiner.*

A. HARRY LEVY, *Examiner.*